(12) United States Patent
Han

(10) Patent No.: US 10,208,728 B2
(45) Date of Patent: Feb. 19, 2019

(54) FUEL AMOUNT DISTRIBUTION METHOD FOR AN ENGINE WITH A DUAL INJECTOR

(71) Applicants: HYUNDAI MOTOR COMPANY, Seoul (KR); KIA MOTORS CORPORATION, Seoul (KR)

(72) Inventor: Min-Kyu Han, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/726,661

(22) Filed: Oct. 6, 2017

(65) Prior Publication Data

US 2018/0149108 A1    May 31, 2018

(30) Foreign Application Priority Data

Nov. 30, 2016 (KR) .................. 10-2016-0161892

(51) Int. Cl.

| F02D 41/30 | (2006.01) |
|---|---|
| F02D 41/40 | (2006.01) |
| F02M 69/04 | (2006.01) |
| F02D 41/24 | (2006.01) |
| F02D 41/14 | (2006.01) |

(52) U.S. Cl.
CPC ......... *F02M 69/044* (2013.01); *F02D 41/247* (2013.01); *F02D 41/3094* (2013.01); *F02M 69/042* (2013.01); *F02D 41/1454* (2013.01); *F02D 2200/0614* (2013.01)

(58) Field of Classification Search
CPC .. F02D 41/402; F02D 41/3094; F02M 69/044

USPC ................... 123/432, 308; 701/103
See application file for complete search history.

(56) References Cited

U.S. PATENT DOCUMENTS

| 7,472,679 | B2 * | 1/2009 | Yamashita | F02B 31/02 123/302 |
|---|---|---|---|---|
| 2012/0072093 | A1 * | 3/2012 | Saruwatari | F02D 41/064 701/103 |
| 2012/0125289 | A1 * | 5/2012 | Mori | F02D 13/0207 123/430 |
| 2013/0066537 | A1 * | 3/2013 | Saruwatari | F02D 41/3094 701/104 |
| 2013/0340719 | A1 * | 12/2013 | Gutscher | F02D 41/3094 123/478 |

(Continued)

FOREIGN PATENT DOCUMENTS

| JP | 60261941 A | * 12/1985 | ............. F02B 29/02 |
|---|---|---|---|
| KR | 10-1406620 B1 | 6/2014 | |

*Primary Examiner* — Mahmoud Gimie
(74) *Attorney, Agent, or Firm* — Brinks Gilson & Lione

(57) ABSTRACT

A fuel amount distribution method is provided to distribute fuel to a plurality of injectors on each of multiple cylinders of an engine with a dual injector. The fuel amount distribution method includes performing, by a controller, a single injection operation in which a single injector of the plurality of injectors constituting the dual injector injects fuel into a corresponding cylinder when a required fuel injection time of the dual injector of at least one cylinder of the multiple cylinders is less than a minimum injection time of each injector of the plurality of injectors of the dual injector. Thereby, precise air-fuel control in a low fuel rate section is achieved.

6 Claims, 2 Drawing Sheets

(56) References Cited

U.S. PATENT DOCUMENTS

Figure 1:
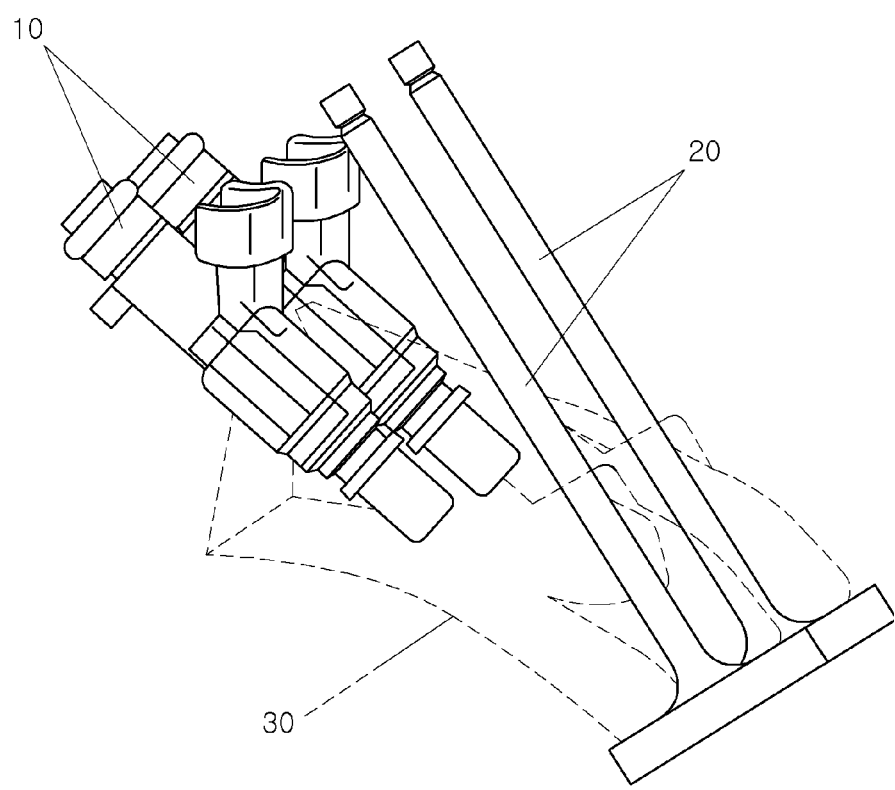

2014/0007843 A1* 1/2014 Kaneko .............. F02D 41/3094
123/445
2014/0116378 A1* 5/2014 Posselt ............. F02M 35/10216
123/337

* cited by examiner

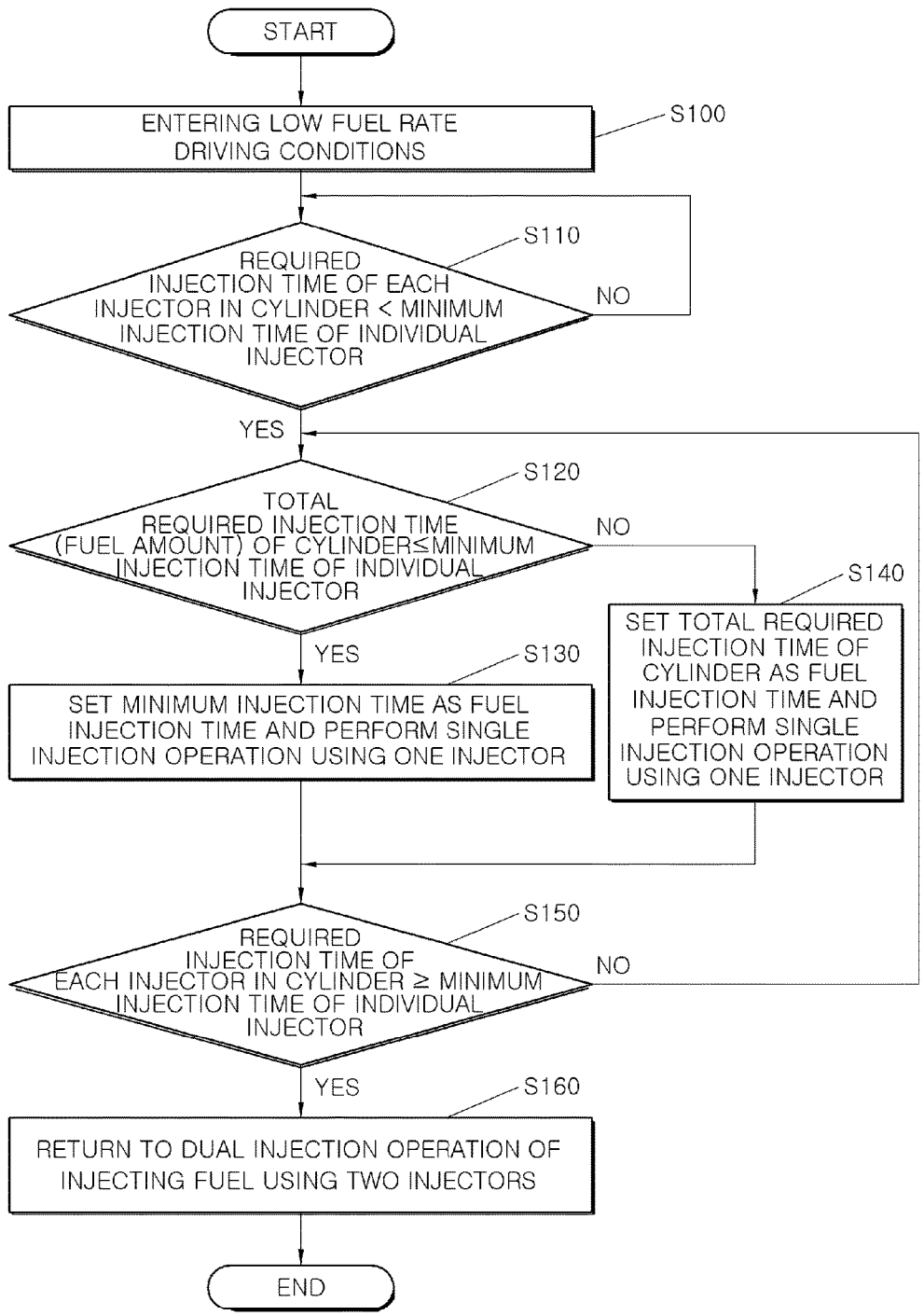

FUEL AMOUNT DISTRIBUTION METHOD FOR AN ENGINE WITH A DUAL INJECTOR

CROSS-REFERENCE TO RELATED APPLICATION

This application claims priority to and the benefit of Korean Patent Application No. 10-2016-0161892, filed on Nov. 30, 2016, which is incorporated herein by reference in its entirety.

FIELD

The present disclosure relates to a fuel amount distribution method for an engine with a dual injector.

BACKGROUND

The statements in this section merely provide background information related to the present disclosure and may not constitute prior art.

In general, a conventional engine is configured such that only one injector is provided for each intake port. Particularly, an MPI (Multi Point Injection) engine is an engine, in which a fuel injection valve is installed on each cylinder, and which is operated in such a way that fuel is injected in advance in each intake manifold. The MPI engine employs a system in which two intake valves and two exhaust valves are provided for each cylinder and a single injector is used for the two intake valves.

Unlike this, an engine with a dual port injector is configured such that two injectors inject fuel into the same cylinder. The two intake ports may communicate with the interior of the same cylinder, and two injectors may be disposed behind intake valves provided to open or close the respective intake ports. In the case where the dual port injector is used, there are advantages in that the fuel efficiency can be enhanced by an increase in volume efficiency, and the harmful material content in exhaust gas can be reduced.

Meanwhile, an injector has a minimum injection time, and the fuel injection time of the injector cannot be controlled to a value less than the minimum injection time. In the case of a low-load driving condition, particularly, in the case of a high-temperature idle or high-concentration purge state, a required injection fuel amount is small, so that the fuel injection time must be controlled to be short. However, we have discovered that if the minimum injection time of the dual injector is not sufficiently short, the required injection time may be shorter than the minimum injection time. In this case, there is a problem in that the fuel injection amount cannot be controlled in a very small amount of fuel.

In the conventional technique, an air-fuel ratio control operation is inactivated, and the fuel injection time is fixed at the minimum controllable injection time of the dual injector. As a result, the amount of injected fuel becomes larger than the required fuel injection amount. For example, in the case where the minimum injection time of the injector is 1.0 ms, and the fuel injection amount distribution coefficients of two injectors in each cylinder are the same as each other and a required injection time of each injector is 0.7 ms, in the conventional technique, each injector injects fuel for a fuel injection time of 1.0 ms greater than the required injection time. Consequently, it is difficult to precisely control the air-fuel ratio.

SUMMARY

In one form, the present disclosure is directed to a fuel amount distribution method for an engine with a dual injector, which can provide excellent injection control performance even in a low fuel rate section.

Other objects and advantages of the present disclosure can be understood by the following description, and become apparent with reference to the forms of the present disclosure.

In accordance with one form of the present disclosure, there is provided a fuel amount distribution method for distributing fuel to a plurality of injectors provided on each of multiple cylinders of an engine with a dual injector. In particular, the method includes performing, by a controller, a single injection operation in which a single injector of the plurality of injectors constituting a dual injector injects fuel into a corresponding cylinder when a required fuel injection time of the dual injector of at least one cylinder of the multiple cylinders is less than a minimum injection time of each injector of the plurality of injectors of the dual injector.

The method may further include a step of setting the minimum injection time of each of the injectors as a fuel injection time when it is determined that a total required injection time obtained by adding the injection times of each of the injectors of the corresponding cylinder is equal to or less that the minimum injection time of each of the injectors constituting the dual injector.

In another form, the method may include a step of setting the required fuel injection time as a fuel injection time when it is determined that a total required injection time obtained by adding the injection times of each of the injectors of the corresponding cylinder exceeds the minimum injection time of each of the injectors constituting the dual injector.

After a fuel injection operation is converted into the single injection operation using a single injector, the method may perform a step of converting the single injection operation to a duel injection operation in which the plurality of injectors of the dual injector inject fuel to the corresponding cylinder when it is determined that the required fuel injection time of the dual injector of the corresponding cylinder satisfies the minimum injection time of each of the injectors constituting the dual injector.

In another form, when the fuel injector operation is converted from a dual injection operation of injecting fuel from the plurality of injectors into the single injector operation using the single injector, the set fuel injection time may be compensated for using a preset compensation map.

In still another form, when the fuel injection operation is converted from the single injection operation using the single injector into the dual injection operation, a fuel injection time in the dual injection operation may be compensated for using a preset compensation map.

In other form, when the fuel injection operation is converted from the single injection operation using the single injector into the dual injection operation, a predetermined option value (hysteresis) may be applied to the required injection time of the dual injector of the corresponding cylinder that is a reference value.

The individual injectors constituting the dual injector may periodically alternately perform the single injection operation.

The individual injectors may alternately perform the single injection operation each time a vehicle travels a predetermined distance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view illustrating an intake port portion of an engine with a dual port injector to which the present disclosure is applied; and FIG. 2 is a flowchart illustrating a fuel amount distribution method for a dual-injector engine.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure may, however, be embodied in different forms and should not be construed as limited to the forms set forth herein. In certain forms, irrelevant to the present disclosure may be omitted to avoid obscuring appreciation of the disclosure.

Hereinafter, one form of the present disclosure will be described in detail with reference to the accompanying drawings.

FIG. 1 is a view illustrating an intake port portion of a dual port injector engine to which a control method of the present disclosure is applied. Referring to FIG. 1, each cylinder of an engine is provided with two intake ports 30 communicating with a corresponding combustion chamber. Each of the intake ports 30 is provided with an intake valve 20 that opens or closes the intake port 30. Furthermore, there are provided a plurality of injectors 10 each of which is disposed behind the corresponding intake valve 20.

In the dual port injector having the above-mentioned configuration, the plurality of injectors inject fuel into the same cylinder through the respective intake ports. Fuel injected through the intake ports is mixed with air and then supplied as a mixture gas into the combustion chamber.

The form of the present disclosure is not limited to the dual port injector shown in FIG. 1, and may be applied to any dual-injector engine so long as the engine includes a plurality of injectors.

FIG. 2 is a flowchart illustrating a fuel amount distribution method for a dual-injector engine in one form of the present disclosure. In FIG. 2, there is illustrated a fuel amount distribution method by which, in the case where a required injection time in an arbitrary cylinder of the dual-injector engine is less than the minimum injection time of each of the individual injectors constituting the dual injector 10, the amount of fuel injected from each injector is controlled to precisely control an air-fuel ratio.

In one form, the control method may be used when the vehicle is in a low fuel rate driving condition (e.g., in a low-load driving mode), that is, when the vehicle that is traveling is immediately before entering a coast-down driving state, or when the vehicle that is stopped is in a high-temperature idle driving state or high-concentration purge state (at step S100). In the low-load driving mode, because a fuel injection rate is reduced, the required fuel injection time of the dual injector 10 may be less than the minimum injection time that is a preset specification of the dual injector. In this case, since the fuel injection time of the injector cannot be controlled to a value less than the minimum injection time, the amount of fuel injected from the dual injector 10 exceeds a required fuel injection amount. Consequently, a targeted air-fuel ratio control operation may not be properly performed.

Therefore, in the present disclosure, a controller such as an ECU (Electronic Control Unit) provided in the vehicle determines whether the required fuel injection time by injectors in an arbitrary cylinder of the engine including a plurality of cylinders is less than the minimum injection time of each of the individual injectors constituting the dual injector 10 (at step S110). For example, when the minimum injection time of each of the individual injectors constituting the dual injector 10 is 1.0 ms and fuel amount distribution coefficients between the two injectors are the same, and when the required fuel injection time through the dual injector 10 is 0.7 ms, the required fuel injection time of the dual injector 10 is less than the minimum injection time of each injector. In this case, according to the conventional technique, fuel is injected through each individual injector for an injection time of 1.0 ms. As a result, fuel is injected for 2.0 ms which exceeds 1.4 ms (0.7 ms+0.7 ms) that is a target total required injection time of the associated cylinder.

Given this, in the present disclosure, the ECU controls the dual injector 10 such that only one injector of the plurality of injectors constituting the dual injector 10 injects fuel for the required fuel injection time. In the case of the foregoing example, unlike the conventional technique in which each of the two injectors injects fuel for 1.0 ms (the total fuel injection time: 2.0 ms), the present disclosure is operated in such a way that one injector injects fuel for 1.4 ms. Therefore, in a low fuel rate section, fuel can also be injected for the required fuel injection time, thus making it possible to precisely control the air-fuel ratio.

In another form, it is determined whether the total required injection time (corresponding to the target injection fuel amount) obtained by adding the injection times of the respective individual injectors for the associated cylinder is the minimum injection time of each injector or less (at step S120). For instance, in the case where the required fuel injection time through the dual injector 10 is 0.4 ms and a preset minimum injection time of each individual injector is 1.0 ms, the total required injection time of the associated cylinder is 0.8 ms obtained by adding the required injection times of the respective injectors and thus is less than 1.0 ms that is the minimum injection time of each injector.

Given the fact that it is impossible to inject fuel for a time less than the preset minimum injection time, the ECU sets the preset minimum injection time (in this example, 1.0 ms) of each individual injector as a target fuel injection time, and controls the dual injector 10 such that only one injector injects fuel for the corresponding injection time (at step S130). In this case, although the actual fuel injection time exceeds the target required fuel injection time, a difference therebetween can be markedly reduced compared to that of the conventional technique.

Meanwhile, in the case where the total required injection time obtained by adding the injection times of the respective individual injectors for the associated cylinder exceeds the minimum injection time of each of the injectors constituting the dual injector 10, the ECU controls the dual injector 10 such that the target required injection time is set as the fuel injection time and only one injector injects fuel for a corresponding injection time (at step S140). With regard to the foregoing example, in the case where the required fuel injection time through the dual injector 10 is 0.6 ms, the total required injection time of the associated cylinder is 1.2 ms obtained by adding the required injection times of the respective individual injectors and thus exceeds 1.0 ms that is the minimum injection time of each injector. Therefore, in this case, the total required fuel injection time (in this example, 1.2 ms) is set as the fuel injection time, in other words, the target fuel injection time, and then the dual injector 10 is controlled such that only one injector injects fuel for the corresponding injection time (at step S140). Thereby, fuel can be injected through the injector by the original target required fuel amount, thus making it possible to precisely control the air-fuel ratio.

Meanwhile, after the injection mode of the dual injector has been converted into a single injection mode using the single injector at the foregoing step, the ECU determines whether the required injection time of each injector of the associated cylinder has satisfied the minimum injection time of each of the injectors constituting the dual injector, so as to determine a timing of returning the injection mode to a dual injection mode (at step S150). When the required injection time of the dual injector 10 of the associated cylinder is the minimum injection time of each of the injectors constituting the dual injector or more, the injection mode is converted into the dual injection mode in which the plurality of injectors injects fuel (at step S160). When the vehicle is out of the low fuel rate section and the target required injection time thus exceeds the minimum injection time of each injector, there is no need any longer to maintain the single injection mode using the single injector. Therefore, as usual, the injection mode is converted into the dual injection mode in which the plurality of injectors are used to inject fuel.

Meanwhile, in the case of the high-temperature idle state and high-concentration purge state while the vehicle is stopped, if the injection mode is frequently changed between the single injection mode and the dual injection mode as the target required injection time frequently reaches the minimum injection time under low-load conditions, this may affect the air-fuel ratio control and combustion stability in transient sections. Accordingly, when the injection mode is converted into the single injection mode, the injection mode may be previously converted when or before the required fuel injection time reaches the minimum injection time of each injector. Furthermore, when the injection mode returns from the single injection mode to the dual injection mode, hysteresis may be given so that the injection mode is inhibited or prevented from being frequently converted between the single injection mode and the dual injection mode. In one form, a predetermined option value may be applied to the required fuel injection time of the dual injector that is a reference condition for returning the injection mode to the dual injection mode so that the timing at which the injection mode is converted from the single injection mode into the dual injection mode can be delayed.

In the case where the vehicle is maintained in a low load or low fuel rate driving mode for a long time, if only one injector continuously performs the single injection operation, the durability of the associated injector may be negatively influenced. Therefore, in the single injection mode, the injector that is used for injection may be periodically converted between the plurality of injectors. For example, when the vehicle moves a predetermined distance or more, or when a predetermined time has passed, the injector that is performing the single injection operation may be changed to another injector.

In an injection system using a PFI-based dual injector, when the injection mode is converted from the dual injection mode into the single injection mode under the above-mentioned conditions, the fuel injection amount may be less than that of the normal dual injection mode under the same fuel amount condition, depending both on compensation for a dead time to an injection valve opening timing by a battery voltage change and on an actual injection position of the injector in the intake port. To compensate for this, in the single injection mode, a compensation map formed based on the RPM of the engine and load conditions may be used to compensate for an injection time in the single injection mode.

Furthermore, when the injection mode is converted into the dual injection mode after the injection operation has been performed in the single injection mode, if fuel (in detail, a fuel wall film) has been removed from the wall of a portion of the intake port on which an injector that has not been used for the injection is disposed, a fuel shortage phenomenon may be momentarily caused when the associated injector reinjects fuel on returning to the dual injection mode. Therefore, when the injection mode returns from the single injection mode to the dual injection mode, the fuel injection time may be compensated for based on the compensation map so as to compensate for the fuel shortage phenomenon.

In a typical PWM (Pulse Width Modulation) method which is used as a method for controlling a PFI (Port Fuel Injection) injector, it is difficult to meet required specifications of a dual injector capable of precisely controlling an air-fuel ratio in a low fuel rate section while satisfying high-temperature idle and high-concentration purge conditions. However, in the case where a control method according to the present disclosure is employed, even when a dual injector having a comparatively long minimum injection time is used, it is possible to precisely control the air-fuel ratio in the low fuel rate section.

According to the present disclosure, it is not required to change the configuration of a controller, for example, not required to install an additional chip set for controlling the air-fuel ratio in the low fuel rate section. The present disclosure employs only a technique of determining the minimum injection time in a dual injection mode and a technique of controlling conversion between the dual injection mode and a single injection mode, thus making it possible to precisely control the air-fuel ratio in the low fuel rate section. Therefore, there is an advantage in that the production cost can be reduced.

While the present disclosure has been described with respect to the specific forms, it will be apparent to those skilled in the art that various changes and modifications may be made without departing from the spirit and scope of the present disclosure.

What is claimed is:
1. A fuel amount distribution method for distributing fuel to a plurality of injectors provided on each of multiple cylinders of an engine with a dual injector, the method comprising:
  determining, by a controller, whether a required fuel injection time of the dual injector of at least one cylinder of the multiple cylinders is less than a minimum injection time of each injector of the plurality of injectors of the dual injector;

performing, by the controller, a single injection operation in which a single injector of the plurality of injectors constituting the dual injector injects fuel into a corresponding cylinder when the required fuel injection time of the dual injector of the at least one cylinder of the multiple cylinders is less than the minimum injection time of each injector of the plurality of injectors of the dual injector, and compensating, by the controller, for the minimum injection time of each of the injectors by utilizing a preset compensation map, when a fuel injector operation is converted from a dual injection operation in which the plurality of injectors of the dual injector injects fuel, into the single injection operation using the single injector, or when the fuel injector operation is converted from the single injection operation to the dual injection operation, wherein the individual injectors constituting the dual injector periodically alternately perform the single injection operation.

2. The fuel amount distribution method of claim 1, further comprising:

setting the minimum injection time of each of the injectors as a fuel injection time when determined that a total required injection time obtained by adding the injection times of each of the injectors of the corresponding cylinder is equal to or less than the minimum injection time of each of the injectors constituting the dual injector.

3. The fuel amount distribution method of claim 1, further comprising:

setting the required fuel injection time as a fuel injection time when determined that a total required injection time obtained by adding the injection times of each of the injectors of the corresponding cylinder exceeds the minimum injection time of each of the injectors constituting the dual injector.

4. The fuel amount distribution method of claim 1, further comprising:

after the fuel injection operation is converted into the single injection operation using the single injector, converting the single injection operation to the dual injection operation when determined that the required fuel injection time of the dual injector of the corresponding cylinder satisfies the minimum injection time of each of the injectors constituting the dual injector.

5. The fuel amount distribution method of claim 4, further comprising:

applying a predetermined option value to the required injection time of the dual injector of the corresponding cylinder, when the fuel injection operation is converted from the single injection operation using the single injector into the dual injection operation.

6. The fuel amount distribution method of claim 1, wherein the individual injectors alternately perform the single injection operation each time a vehicle travels a predetermined distance.

\* \* \* \* \*